March 27, 1934. P. S. MORGAN 1,952,882
FLUID METER
Filed Feb. 6, 1932 4 Sheets-Sheet 1

INVENTOR
PORTER S. MORGAN
BY Albert R Henry
ATTORNEY

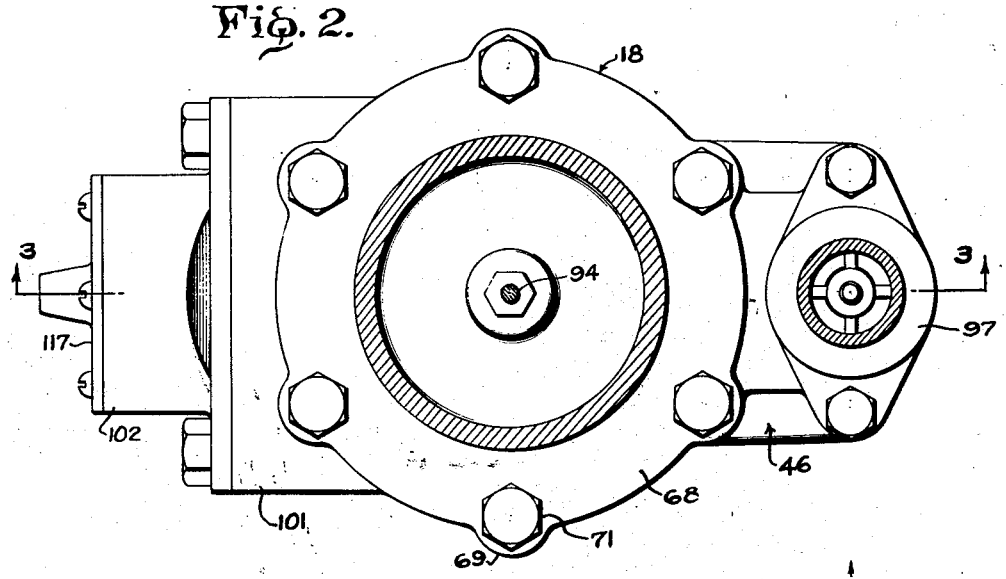
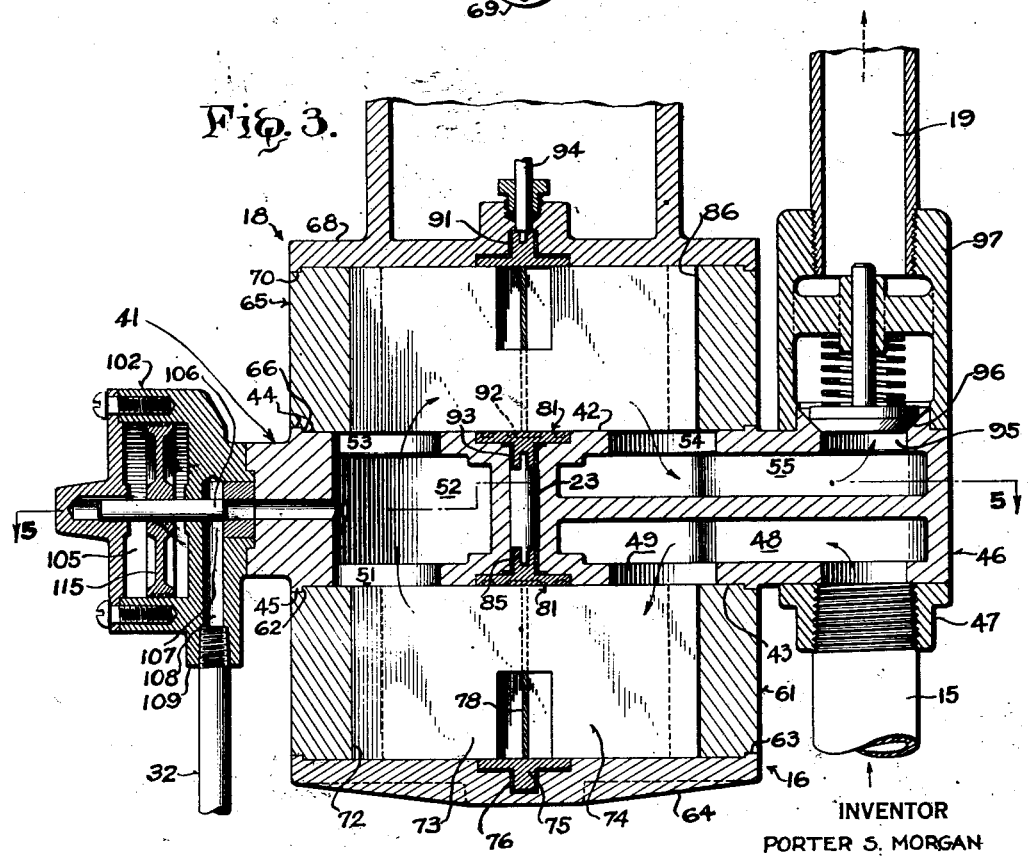

INVENTOR
PORTER S. MORGAN
BY Albert R. Henry
ATTORNEY

March 27, 1934.  P. S. MORGAN  1,952,882
FLUID METER
Filed Feb. 6, 1932  4 Sheets-Sheet 4

INVENTOR
PORTER S. MORGAN
BY Albert R. Henry
ATTORNEY

Patented Mar. 27, 1934

1,952,882

UNITED STATES PATENT OFFICE 1,952,882

FLUID METER

Porter S. Morgan, Norwalk, Conn., assignor, by mesne assignments, to Liberty Share Corporation, Buffalo, N. Y., a corporation of New York Application February 6, 1932, Serial No. 591,321

14 Claims. (Cl. 73—167)

This invention relates to fluid meters, and it has particular reference to the provision of a fluid metering system which is accurate irrespective of changes in the rate of flow of liquid being measured.

In the metering of liquids, recourse is usually made to a movable device placed in the path of the liquid, the extent of motion being utilized as a direct index to the volume of liquid passing through the path. In such devices, errors are encountered due to the leakage or slippage of liquid flowing past the measuring element without imparting motion thereto, and, as the amount of slippage varies with changes in liquid velocity, calibration of the meter for some definite rate of flow does not eliminate the error when the stream itself has a varying velocity.

According to the present invention, means are provided to eliminate the effect of such errors, so that the meter is accurate at all rates of flow of fluid which may be passed through it. The provision of such means, in their fullest embodiment, and that now best known to me, makes use of a number of principles, which, severally and jointly, as pointed out in the appended claims and as hereinafter more fully explained, may be utilized in obtaining a highly efficient meterng system.

The utility and application of the invention will be herein described with reference to a system for measuring gasoline, as delivered by a retail vendor, although it will be understood that this reference is but exemplary, as the invention is otherwise applicable. In dispensing gasoline, the usual situation is that the vendor is called upon to deliver a limited quantity of liquid to the tank of an automobile, and for this purpose use is made of a gasoline reservoir, from which gasoline is delivered by a pump through a meter, and thence to a delivery hose having a control nozzle at the end thereof. In the dispensing of the gasoline, the vendor operates the nozzle from a closed to an open, and again to a partially closed and finally fully closed position, thereby effecting sudden changes in the speed of the liquid, the resistance in the delivery line, the speed of the pump and meter, and the pressures on the intake and discharge sides thereof. These variations create surges of liquid, which tend to force the gasoline past the meter, in either direction, and hence any calibration which might be made, to correct for the error occurring at some definite flow, is made ineffective.

According to the present invention, these defects, as well as certain mechanical objections to meters now in use for this purpose, are overcome, by removing the tendency on the part of the liquid to escape past the measuring element at any rate of flow or difference in head, and by providing means to divide or proportion the stream of meter fluid, so that sudden pressure changes are relieved without exerting force on the measuring element. In the specific embodiment of the principles of the invention herein illustrated, the actual measuring element of the meter is allowed to move freely with the fluid, so that it acts neither as a resistance nor an accelerant to the fluid flow. To obtain this effect, the liquid stream first operates a hydraulic motor of different capacity than the measuring device, and the liquid discharged by this motor is delivered in proper proportion to the measuring element, which is operated or rotated by the motor itself. A by-pass line is provided, in the conduit connecting the motor and meter, so that excess liquid may be withdrawn from the system, and, to insure that the elements may be self regulating, the opening into the by-pass line is controlled by a valve mechanism, the movement of which is responsive to the variations in fluid pressure which may occur between the input and discharge passages of the measuring element.

The invention further comprehends, in addition to the principles indicated just above, the provision of metering devices which are economical and efficient in manufacture and operation, as will be readily apparent from the following detailed description, wherein reference is made to the accompanying drawings, in which:

Fig. 2 is a top view partially in cross section of the metering device.

Fig. 3 is a section on the line 3—3 of Fig. 2.

Figure 1:
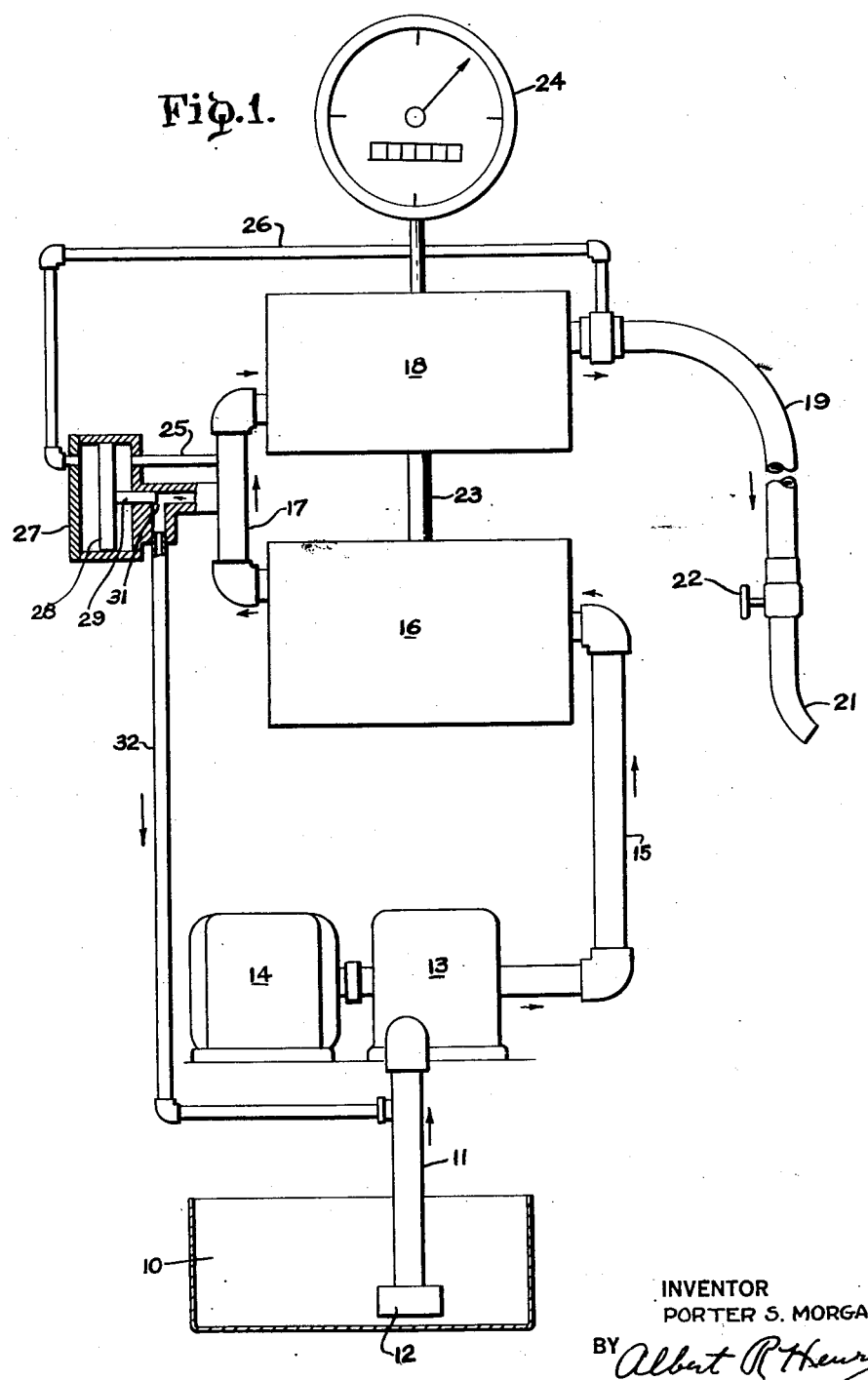
Fig. 1 is a schematic view of a fluid dispensing system including the present invention.

The invention is shown in Fig. 1 as applied to a system for dispensing gasoline or other fluid. The liquid to be measured may be assumed to be contained in a reservoir 10 in which is disposed a conduit 11, provided with a foot valve 12 disposed in the reservoir and in communication with a pump 13, operated by a motor 14 or other suitable source of power. The liquid delivered by the pump is discharged into a pipe line 15 and into a fluid motor 16, the fluid motor itself being driven by the force of the liquid delivered by the pump. From the discharge side of the fluid motor 16 the liquid is delivered, by means of a connecting conduit 17 to a fluid meter 18, and, after passing through the meter, is delivered through a conduit 19 to a nozzle 21, the orifice of which may be regulated by means of a suitable valve 22.

A mechanical connection, such as a drive shaft 23, inter-connects the rotor elements of the fluid motor 16 and the fluid meter 18 so that the fluid meter is rotated by means other than the force of the liquid itself. An indicating device 24 is also connected to the rotor of the meter 18 and may be of standard or well known construction. The function of the indicator device or "clock" is to indicate the extent of operation of the fluid meter, and thereby indicate the amount of fluid which the meter has measured.

It will be observed that, on the intake side of the fluid meter is a pressure conduit 25, and on the discharge side of the meter 18 is another conduit 26, which conduits are connected to opposite sides of a control chamber 27, in which is disposed a movable member 28, so that an excess of pressure in either of the pipe lines 25 or 26 will cause a movement of the element 28. It will also be observed that the element 28 is attached to a stem 29, which controls the position of a valve 31, interposed between the conduit 17 and a vent or return line 32, which may transmit its contents to the intake side of the pump 13, as, for example, to a point in the pipe line 11.

It may also be noted that the output capacity of the fluid motor 16 in the specific embodiment of the invention herein described is greater than the capacity of the meter 18. With this relationship, it will be apparent that, for any speed of operation of the device, the fluid motor 16 will discharge a greater quantity of fluid to the meter 18 than can be properly disposed of by the meter. However, by suitably connecting and by controlling the discharge of the drain line 32, a portion of the liquid discharged by the motor 16 may be removed so that it exerts no disproportional influence on the meter 18.

The extent to which liquid may be so withdrawn from the pipe line 17 depends, of course, upon the opening of the valve 31, and the valve position is controlled or determined by the relationship in pressures on the intake and discharge sides of the meter 18. It will be observed that whatever pressure there may be in the pipe lines 25 and 26 is transmitted to the movable element 28 of the control chamber 27, so that the member 28 seeks that position wherein the pressures on its opposite sides will equal each other. This condition obtains when the pressure on the intake side of the meter is equal to the pressure on the discharge side thereof, and hence it will be observed that the opening of the valve 31 is such at all times as to supply that quantity of fluid from the motor 16 to the meter 18 which will pass through the meter without expending any work thereon or having any work expended upon it to effect its transmission.

Under these conditions there is no differential of pressure between intake and discharge sides of the meter to cause slippage of the liquid and hence the meter is accurate at all speeds of operation.

When the pump 13 is started, but while the valve 22 in the discharge line 19 is still closed, the internal resistance to the flow of fluid is such that neither the fluid motor 16 nor the meter 18 are placed in operation. When, however, the valve 22 is open, the motor 16 and the meter 18 are placed in operation to measure the amount of liquid passing out of the system, at whatever speed may be permitted by the opening of the valve 22.

With this general outline of the various features of a liquid dispensing system, including the present invention, reference will now be made to various structural features advantageously included in a unitary device comprising the motor 16, the meter 18 and the associated parts thereof.

Although it will be obvious that the fluid motor and the metering device may be of various types of either rotatable or oscillating positive displacement devices responsive to fluid under pressure, it is preferred that these devices take the form hereinafter set forth.

Figure 6:
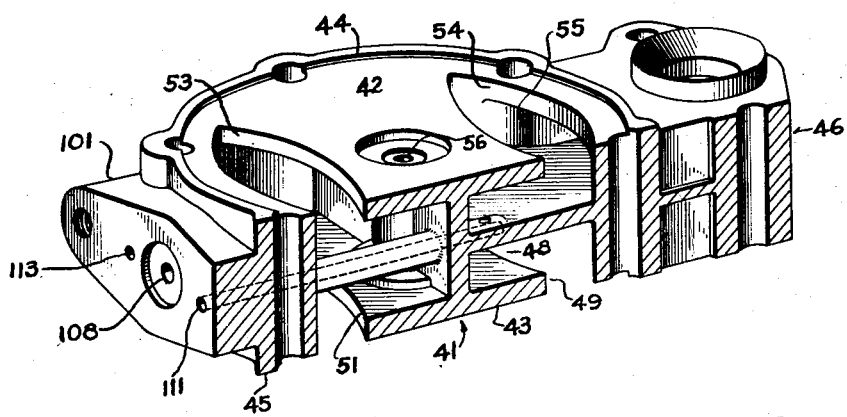
Fig. 6 is a perspective view of the mounting body with portions broken away to further show the various passages therein.

The metering device comprises a central disc or mounting member 41, which is preferably a casting having opposite circular faces 42 and 43, which are defined by annular shoulder portions 44 and 45 respectively. The member 41 is provided with an extension 46 to which conduit 15 is secured by a flange member 47. The conduit 15 has access to an internal cored portion of the member 41 which forms a motor inlet passage 48 (Figs. 3 and 6). The inlet passage is provided with an outlet entering through the face 43 in the form of an arcuate motor inlet port 49. A similar port, the motor outlet port 51, enters through the face 43 at a point diametrically opposite to the outlet port 49. The motor outlet port enters into a large cored chamber 52 previously described as the equalizing chamber. The opposite face 42 of the mounting member is provided with similar ports, namely the meter inlet port 53 and the meter outlet port 54, the latter port entering into a cored passage 55 previously described as the meter outlet passage. A coupling passage 56 extends laterally through the mounting member in concentricity with the annular shoulders 44 and 45.

The faces 42 and 43 of the mounting member form end wall portions of a meter housing and a fluid motor housing respectively. The fluid motor housing comprises a cylindrical member 61 having a complementary annular shoulder portion 62 which engages the annular shoulder 45 of the mounting member. The opposite extremity of the cylindrical member 61 is provided with an annular shoulder portion 63 and is capped by a cover plate 64 which fits over such end. Similarly, the meter housing comprises a cylindrical member 65 having an annular portion 66 for engaging the annular shoulder 44 of the mounting member. The opposite extremity of the cylindrical member 65 is provided with an annular shoulder 70 and this housing is completed by a second cap member or cover plate 68. Both of the cylindrical members and both cover plates contain spaced recessed bosses 69 through each of which a connecting bolt 71 is entered. The bolts pass through the top cover plate 68, the bosses in the cylindrical member 65, similar bosses in the mounting member 41, and through the remaining cylinder 61 and its cover plate 64. Thus the structure of the meter device is secured together by the bolt members 71.

Figure 7:
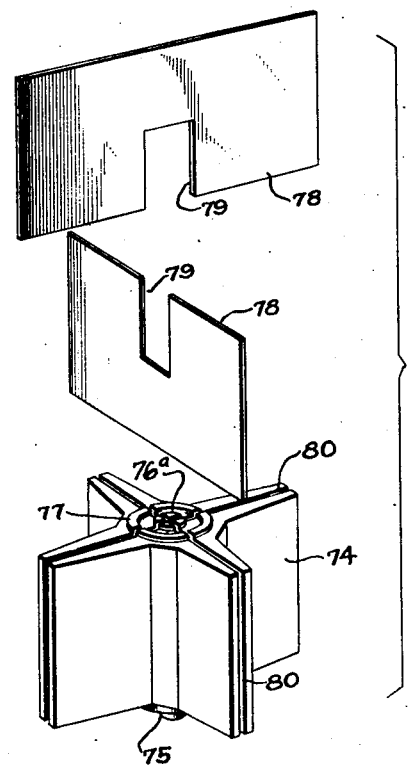
Fig. 7 is an exploded perspective view of the motor or meter unit rotor.

The inner wall 72 of the cylindrical member 61 is devised to receive and cooperate with a rotor unit 73, which is rotatably mounted therein. The rotor unit comprises a cruciform spider 74 (Fig. 7) which is provided at its lower extremity with a hub portion 75, rotatably mounted in a bushing 76 provided in the central portion of cover plate 64. The arms of the spider 74 are slotted, as indicated by the numeral 80, and such slots extend from the upper end of the spider to the hub portion 75. The upper end of the spider is formed with a central hub portion 76a and a concentric outer ring portion 77. Vanes 78 are inserted in the slots 80 and each comprises a thin rectangular member having a centrally located marginal slot 79. The slot in one vane engages over the unslotted central portion of the remaining vane, as shown in Fig. 7. Thus when inserted in the slots 80 of the spider, the vanes cross each other with their upper and lower extremities in substantially the same planes. As hereinafter more fully pointed out, the vanes are adapted for lateral movement in their relative slots 80 independent of each other. The height of the vane is substantially equal to the height of the cylindrical member 61 and the vanes are slidably mounted between the cover plate and the faces of the mounting member 41.

Figure 8:
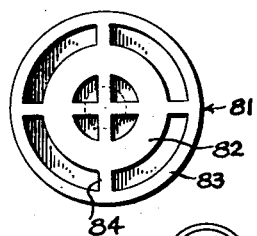
Fig. 8 is a plan view of the securing member.

The spider and vanes thus assembled are capped with a securing member 81 (Figs. 3 and 8). This is a flanged cylindrical member having at its lower face a pair of concentric rings 82 and 83, which engage over the central hub 76a and ring 77 of the spider 74 (Fig. 7) and thereby engage the unsupported top ends of the segments of the spider and retain the same in fixed relation relative to each other. In addition to this, the securing member 81 is provided with four spline beads 84, which are arranged at quadrants and are adapted to enter into the top end of the slots 80 to substantially key the securing member to the rotor for common movement. The upper end of the securing member is diametrically slotted at 85 to form a portion of a means for connecting with a metering device 18.

The inner wall 72 of the casing 61 is devised to cooperate with the slidable vane members 78 of the rotor to provide therewith a positive displacement device.

The wall 72 of the member 61 is formed with arcuate surfaces so arranged that, intermediate the inlet and outlet ports 49 and 51, there are opposed cylindrical surfaces sweeping out arcs of about ninety degrees, and struck from a common center (which is also the center for the rotatable spider 74), but which circular arcs are of different radius. Connecting the cylindrical arcs are curved surfaces, merging into the cylindrical portions, and so devised that the diameter of the chamber defined by the wall 72, and taken through the common center, is a constant. In practice, several curves may be employed as the connecting curves, as, for example, spirals, but it will be found advantageous to make these connecting curves as harmonic curves or sine curves, and this for the reason that the rate of change of curvature at the merging points is a minimum, and hence there will be a minimum change in the acceleration and deceleration of the vanes, which move back and forth in straight lines relative to the rotor as defined by the slots 80, as the rotor 74 revolves with the ends of the vanes 78 in contact with the wall 72 at all times.

Figure 4:
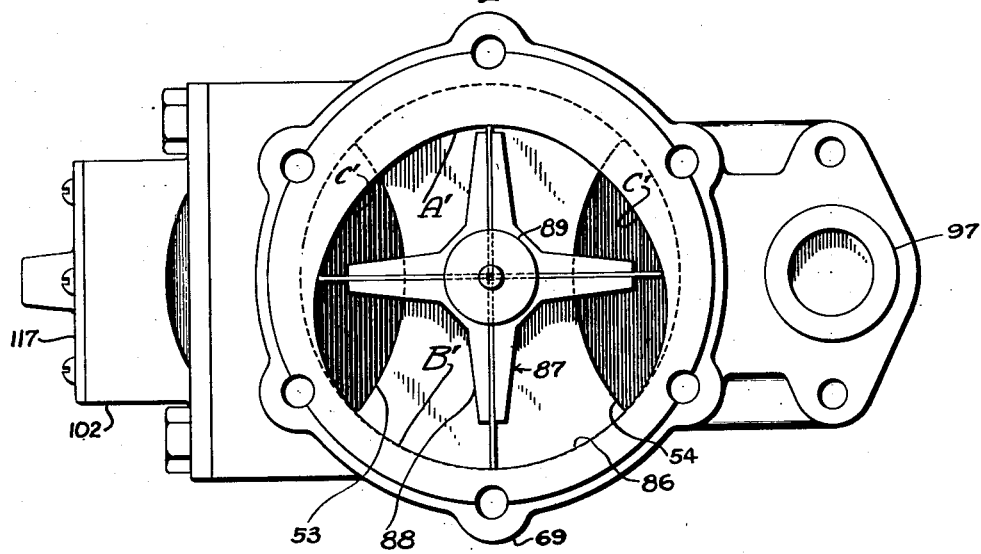
Fig. 4 is a plan view of the meter device with the cover plate removed.
Figure 5:
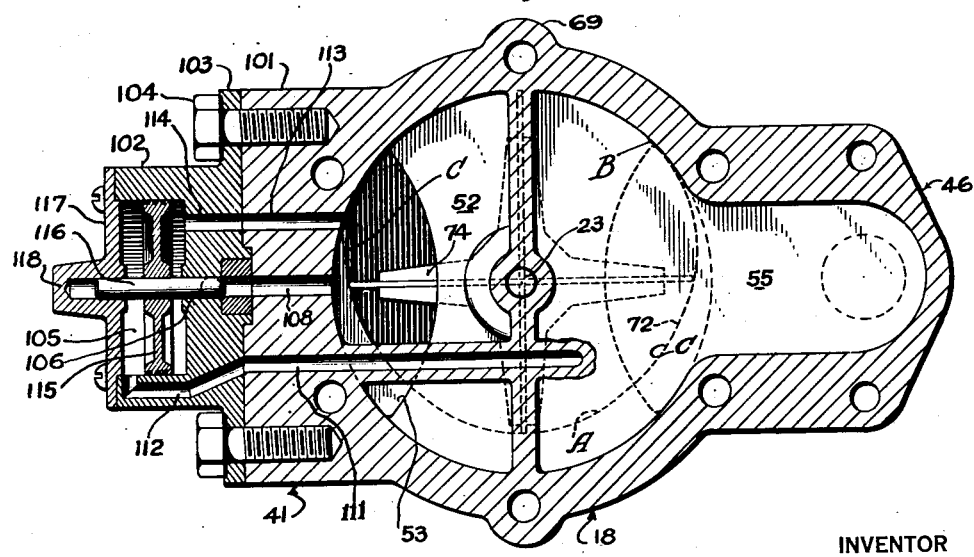
Fig. 5 is a section on the line 5—5 of Fig. 3, showing the passage arrangement in the mounting body.

In Fig. 5, the circular arc of short radius is indicated by the letter A, and is shown in dotted line since it lies beneath the plane of the figure. The circular arc of long radius is located by the letter B, while the two connecting arcs, one of which is partly visible, are indicated by the letters C, C. In Fig. 4, the arcs A', B', C', C', define a similar wall 86 for the measuring chamber, as will be presently described.

As a result of the above described construction, liquid under pressure entering the fluid motor chamber through the motor inlet port 49 enters one or more of the quadrants formed by the vanes of the rotor unit which is adjacent such port. Inasmuch as the vane area on the longer arm of such quadrant is greater than the vane area on the remaining arm of the quadrant, the liquid under pressure will force the rotor in a counterclockwise direction (Fig. 5). Following the counterclockwise travel of this particular quadrant of the rotor, it will be noted that it retains a full load of liquid upon entering the major arcuate segment and that upon further movement, the vanes are shortened upon contact with the opposite curved surface adjacent the output port 51 of the fluid motor. The volumetric capacity of such quadrant due to the shortening of the vanes will be reduced and thus a portion of the liquid will be forced into the output passage 51 and to the equalizing chamber 52. The portion of the liquid thus forced out will be substantially equal to the difference between the segments formed by minor and major arcuate portions of the chamber.

It is preferred that the inner wall 86 of the meter cylinder 65 (see Fig. 4) be similarly constructed in cross sectional arrangement to the described wall 72 of the fluid motor unit, with the exception that the arrangement be inverted in respect to its major and minor radii. In addition to this the height of the cylinder 65 is less than that of the cylinder 61 so that the volume of liquid displaced therein is less than the volume displaced in the motor 16. The chamber formed by the inner wall 86 is adapted to contain a rotor unit 87 of identical construction to the rotor unit 74 of the fluid motor as above described, with the exception of the aforementioned diminution in height. The rotor unit 87 comprises a spider member 88 having a hub portion 89 engaging a bushing 91 located in the central portion of the cover plate 68. The opposite extremity of the spider 88 contains a central hub 92 formed similar to hub 76a of spider 74 which is received by a second securing member 81 which secures such end of the spider against displacement of the quadrants formed by the slots therein.

The hub portion of the upper securing member 81 is mounted in a suitable bushing 93 located in the mounting member and its slot 85 engages a coupling member hereinabove identified as shaft member 23. Opposite extremities of the coupling are formed to provide rectangular portions engageable in the opposed slots 85 of the upper and lower securing members 81, thus connecting the securing members and thereby connecting the rotor units 74 and 88 for united rotating movement.

As will be seen in Fig. 3, the upper end of the meter rotor 88 is slotted to receive a pin 94 which rotates with the rotor 88, and serves to drive an indicating device 24, illustrated diagrammatically in Fig. 1.

Fluid discharged from the meter 18 passes outwardly through the port 54 into the chamber 55 formed in the member 41, and thence through an orifice 95, which is normally sealed by a spring pressed valve 96. These elements are contained in a boss 97, to the outer end of which may be connected the delivery pipe 19.

The control chamber 27 is conveniently secured to a boss 101 on the side of the mounting member opposite the extension 46 and it comprises a housing 102 flanged at 103 and secured through such flanges to the boss 101 by cap screws 104 (Figs. 3 and 5). The housing contains a cylindrical piston chamber 105 and a valve stem hole 106 concentric therewith. A vent chamber 107 is provided within the body of the housing and is in communication with the valve stem hole and is also in communication with a vent hole 108 which terminates in a boss 109. The left hand side of the chamber 105 is in communication with the meter outlet 55 of the meter by means of a drilled conduit 111 provided in the mounting member 41 and a passage 112 registering therewith. The right hand side of the chamber 105 is in direct communication with the equalizing chamber 52, by means of a drilled hole 113 in the mounting member 41 and a registering drilled hole 114 in housing 102. A fluid pressure responsive member is mounted within the piston chamber 105 and is preferably a piston 115 secured to a valve stem 116. The valve stem engages through the valve stem hole 106, and, in the opposite direction protrudes beyond the face of the chamber. The housing is capped by a cover plate 117 containing a central bearing portion 118 for receiving the latter end of the valve stem in bearing engagement therewith.

It will thus be seen that the fluid pressure existing at the discharge side of the meter 18 is communicated through the bore 111 to one side of the piston 115, while the fluid pressure on the intake side of the meter is transmitted, through the bore 113 to the opposite side of the piston 115, and that, as the piston is moved to the left (as viewed in Fig. 3) the vent 108 from the chamber 52, on the discharge side of the motor 16, is placed in communication with the vent 107, and thence to the suction side of the pump 13 through return line 32.

The operation of the apparatus, when assembled in the relationship shown in the drawings, is as follows. Liquid supplied to the fluid motor unit 16, through the pipe 15, enters the quadrant of the rotor 74 defined by the cylindrical arc of major radius and a pair of vanes 78. The pressure of the liquid causes the rotor 74 to rotate, and deliver liquid to the chamber 52 through the motor discharge port 51. The same act of rotation causes the rotor of the meter to revolve, since the two rotors are interconnected. Whatever fluid is delivered to the meter 18, therefore, will be moved with it, and thence through the ports 54 and 95 into the delivery line of the system.

The function of the rotor in the meter 18, of course, is to affect the indicating device 24 in a degree which will accurately represent the amount of liquid which has passed through the meter. As slippage would result, with inaccuracies of measurement, if the meter rotor acted as a pump, or as a motor, the provision of the fluid motor 16 tends to relieve the fluid stream from expending any work on the meter rotor itself. This is tantamount to saying that, in operation, the pressures on opposite sides of the fluid meter 18 are equalized, so that there is no tendency for liquid to slip past its vanes in either direction.

The control chamber 27 is provided to chiefly effect such equalization. If, for example, the pressure of the fluid on the intake side of the meter 18 be greater than the pressure on the discharge side thereof, that difference in pressure will cause a movement of the piston 115 to the left, thereby opening the vent 108, and bleeding from the meter inlet supply that quantity of fluid which will serve to make the fluid pressures on opposite sides of the meter equal to each other. As the capacity of the motor is greater than that of the meter, the vent 108 will normally be open, and the degree of opening will be automatically made such, irrespective of the rate of fluid delivery, as to maintain the relationship desired. In operation, therefore, the piston 115 will move in response to changes in the difference in pressure across the meter.

It will be noted that the structure and operation of the motor or meter is such as to make for smooth and quiet operation, and that, while there may be slippage in the motor itself, such slippage is immaterial, since the meter is always supplied with a full quantity of liquid which does not expend any energy on the driven rotor of the meter. It will also be noted that in the present invention, no attempt is made to vary the speed of the motor or the meter to meet such pressure conditions as may be encountered, but that, on the contrary, the object is to supply the meter with that quantity of liquid which it may handle without slippage, irrespective of its speed, which in effect is controlled by the opening of the valve 22 in the nozzle 21.

Figure 9:
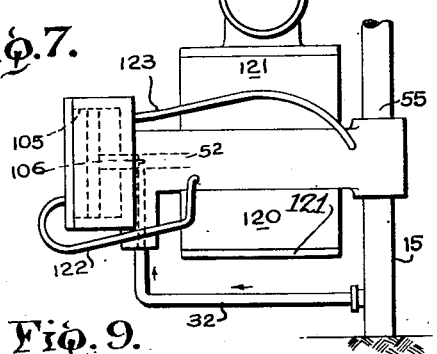
Fig. 9 is a diagrammatic view showing a different arrangement for the vent pipe.

It is contemplated that the invention may be utilized with fluid supply systems where it would not be feasible to connect the return line 32 to a suction line, for example, the meter device may be utilized to meter water from a city water supply. Under these circumstances, the device is modified in the manner shown diagrammatically in Fig. 9, wherein the fluid motor as indicated by the numeral 120 is devised to have an output capacity less than that of the fluid meter 121, thus causing a smaller pressure to be set up in the equalizing chamber 52 than in the outlet passage of the meter. In this event it is necessary to feed liquid to the equalizing chamber rather than to remove liquid, as in the described embodiment. This is accomplished by connecting a pressure conduit 122 to the left hand side of the piston chamber 105 and to the equalizing chamber and by providing a second conduit 123 connecting the right hand side of the piston chamber to the output of the meter. The return line 32 is directly connected to the fluid supply pipe 15, which may in this case be a city supply line. Thus, the valve 106 is caused to open when the pressure in the equalizing chamber is less than that in the outlet passage 55, whereupon fluid is fed from the pressure line 15 to such chamber until pressures are equalized and the valve 106, in response to the piston differential, is set at a position commensurate with the demands of the equalizing chamber.

It will be understood that numerous variations and modifications in the specific embodiment shown may be made without departing from the principles of the invention. It is likewise apparent to those skilled in the art that other means could be employed to control the position of the piston 115, and hence it will be understood that it is not intended to present this description as a limitation of the invention, the scope of which should be ascertained from the following claims.

I claim:

1. In a liquid measuring device, a meter device comprising a fluid responsive driving instrumentality having input and output ports, a meter having a movable metering element, said meter having an input and an output port, means operatively connecting the metering element to the driving instrumentality, a conduit connecting the output port of said instrumentality to the input port of the meter, said driving instrumentality being driven by the fluid under pressure and adapted to deliver quantities of liquid to the meter in excess of the capacity of said meter, a fluid responsive member in fluid communication with said conduit and the output port of the meter, said member being responsive to pressure variations therein, a venting conduit in communication with said conduit, valve means for controlling the passage of fluid therethrough, said valve means being connected to and operated by said fluid responsive member whereby excess quantities of liquid in said conduit are diverted therefrom to equalize pressures on opposite sides of the meter.

2. In a liquid measuring device, a liquid meter unit having a movable metering element, a fluid motor unit for driving said metering element, means operatively connecting the motor to the metering element, a conduit connecting the output of the motor to the input of the meter, one of said units having a capacity greater than the remaining unit, fluid means connected to said conduit for substantially equalizing the input volume of liquid to the meter with the output capacity thereof, and means responsive to pressure conditions on opposite sides of the meter for controlling the application of said fluid means to said conduit.

3. In a liquid measuring device, means supplying liquid under pressure, a fluid motor in communication with the liquid supplying means and operated by the liquid under pressure, a liquid meter, a driving connection between said motor and meter, a fluid connection between the exhaust of said motor and intake of said meter, means responsive to the variations of pressures in the output of the meter and said fluid connection, a venting conduit connected to said fluid connection and valve means in said conduit controlled by said means.

4. In a liquid measuring device, means supplying liquid under pressure, a fluid motor in communication with the liquid supplying means and operated by the liquid under pressure, a liquid meter having a movable metering element, means operatively connecting the fluid motor to said metering element, a fluid connection between the exhaust of the motor and the input of the meter, for supplying said meter with liquid, venting means in said fluid connection, and means responsive to variations in pressure on opposite sides of the meter for operating said venting means.

5. A fluid measuring apparatus comprising a movable measuring member, a fluid motor for driving the measuring member, a driving connection between said motor and said measuring member, a conduit for delivering fluid discharged from the motor to the mesuring member, control means responsive to differences in fluid pressure on opposite sides of the measuring member, and means actuated by said control means for governing the flow of fluid through said conduit.

6. A fluid measuring apparatus comprising a movable measuring member, fluid supply means for the measuring member, means for equalizing pressures on opposite sides of the measuring member comprising control means responsive to variations in fluid pressure on opposite sides of the measuring member, means actuated by the control means for controlling the quantity of fluid supplied through said fluid supply means, and other means connected to and driving the measuring member.

7. A fluid measuring apparatus comprising a movable measuring member, a casing for said member, a fluid motor, a driving connection between said fluid motor and said movable measuring member for operating said member in said casing, means for supplying fluid to said motor to operate the same, a conduit for conveying fluid passing through the motor to said casing and said movable measuring member, a discharge means for fluid passing through said casing, control means responsive to fluid pressure variations across said measuring member associated with said member and said casing, and means actuated by said control means for equalizing the pressure of the fluid delivered to said casing through said conduit and the pressure of fluid discharged from said casing through said discharge means, whereby fluid slippage between said casing and said movable measuring member is eliminated.

8. A liquid metering system comprising a liquid motor, means for supplying liquid to the motor to operate the same, a liquid meter, a conduit connecting the discharge side of the motor and the inlet side of the meter, and a driving connection between the motor and the meter whereby energy for effecting the operation of the meter is expended in the motor, and means responsive to pressure variations across said meter associated with said conduit for modifying the volume of liquid flowing therethrough.

9. A liquid metering system comprising a liquid motor, means for supplying liquid to the motor to operate the same, a liquid meter, a conduit connecting the discharge side of the motor and the inlet side of the meter, and a driving connection between the motor and the meter whereby energy for effecting the operation of the meter is expended in the motor, said motor having a fluid capacity differing from that of the meter, and means for correcting the difference in capacity associated with said connecting conduit.

10. A fluid measuring apparatus comprising a casing, a rotor element in said casing, a second casing, a second rotor element therein, one of said casings and contained rotors being adapted to serve as a motor and the other casing and rotor being adapted to serve as a meter, a mounting member interposed between said casings, said member being internally formed with ports whereby the normal liquid path is into the motor casing and thereafter into said meter casing, means for securing said casings and member in unitary assembled relationship, and means responsive to pressure variations across said meter associated with said conduit for modifying the volume of liquid flowing therethrough.

11. Fluid measuring apparatus comprising a movable measuring member, a supply pipe adapted to convey fluid under pressure to said measuring device, a second fluid supply pipe connected to said measuring member to provide a dual source of supply therefor, valve means for controlling the effective orifice in one of said supply pipes and thereby the amount of fluid which may be supplied through said pipes to said measuring member, control means responsive to differences in fluid pressure across said measuring member, and means connecting said control means and said valve means.

12. Liquid dispensing and measuring apparatus comprising a source of liquid under pressure, a liquid motor connected to said source, a measuring member, a driving connection between said motor and said measuring member, a conduit extending from the discharge side of the motor to the measuring member, a discharge line extending from said measuring member and terminating in a nozzle of variable orifice, a movable control member, means for transmitting fluid pressures on opposite sides of said measuring member to opposite sides of said control member, a branch conduit in said conduit, a valve in said branch, and means connecting said valve to said control member, whereby variations of pressure across said measuring member will operate said control member and thereby said valve.

13. Fluid measuring apparatus adapted to be interposed in a fluid conduit delivering fluid from a source under pressure to a discharge point of lower pressure comprising a fluid supply line, a fluid motor connected to said line, a conduit connected to the discharge side of said motor, a fluid meter, said conduit being connected at its opposite end to said fluid meter, a discharge line leading from said meter, said motor and meter being of different capacities, a driving connection between the motor and the meter, a branch pipe in said connecting conduit, valve means varying the relative cross-sectional areas of said connecting conduit and said branch, a control device for operating said valve means, and fluid connections from opposite sides of said meter to said control device, whereby said control device is responsive to variations in fluid pressure across said meter to operate said valve.

14. A fluid measuring apparatus comprising, in combination with a source of fluid supply, a measuring member provided with a movable element and an inlet port and a discharge line, a fluid supply pipe communicating between the source of fluid supply and said inlet port, a branch line hydraulically connected at one end to said inlet port and at its opposite end to a low pressure reservoir independent of said discharge line, valve means controlling the flow of fluid from said inlet port to said branch line, a control device responsive to differences in fluid pressure on opposite sides of said movable element, and means connecting said control device and said valve means whereby operation of said control device regulates the volume of fluid flowing from said inlet port to said branch line.

PORTER S. MORGAN.